United States Patent
Okonogi et al.

(10) Patent No.: US 12,220,979 B2
(45) Date of Patent: Feb. 11, 2025

(54) SUPPORT DEVICE FOR VEHICLE BATTERY PACK AND ELECTRIC VEHICLE

(71) Applicant: Daimler AG, Stuttgart (DE)

(72) Inventors: Shigeru Okonogi, Kanagawa (JP); Mahaganesh Rajakutty, Tamil Nadu (IN); Vigneshwar Gunasekaran, Tamil Nadu (IN); Kesavan Ganapathy, Tamil Nadu (IN); Guru Prasad Reddy, Tamil Nadu (IN)

(73) Assignee: Daimler Truck AG, Leinfelden-Echterdingen (DE)

( * ) Notice: Subject to any disclaimer, the term of this patent is extended or adjusted under 35 U.S.C. 154(b) by 320 days.

(21) Appl. No.: 17/774,775

(22) PCT Filed: Aug. 27, 2020

(86) PCT No.: PCT/JP2020/032288
§ 371 (c)(1),
(2) Date: May 5, 2022

(87) PCT Pub. No.: WO2021/090554
PCT Pub. Date: May 14, 2021

(65) Prior Publication Data
US 2022/0388385 A1    Dec. 8, 2022

(30) Foreign Application Priority Data
Nov. 6, 2019    (JP) .................. 2019-201687

(51) Int. Cl.
*B60K 1/04*    (2019.01)
*B62D 21/02*    (2006.01)
(Continued)

(52) U.S. Cl.
CPC ............ *B60K 1/04* (2013.01); *B62D 21/02* (2013.01); *H01M 50/204* (2021.01);
(Continued)

(58) Field of Classification Search
CPC .............. B60K 1/04; B60K 2001/0405; B60K 2001/0444; B60K 2001/0438; B62D 21/02
See application file for complete search history.

(56) References Cited

U.S. PATENT DOCUMENTS 11,043,714 B2 *   6/2021   Sloan ..................... B60L 50/64
11,912,122 B2 *   2/2024   Bohmer ................ B60L 50/64
(Continued)

FOREIGN PATENT DOCUMENTS

CN    110239328 A    9/2019
JP    2007-331669 A    12/2007
(Continued)

OTHER PUBLICATIONS

Japanese Office Action issued in Japanese Application No. 2019-201687 dated Aug. 8, 2023, with English translation (8 pages).
(Continued)

*Primary Examiner* — Brian L Swenson
(74) *Attorney, Agent, or Firm* — Crowell & Moring LLP

(57) ABSTRACT

A support device configured to support a battery pack including a first battery accommodating portion arranged in a first space between a pair of side rails constituting a ladder frame of a vehicle, a second battery accommodating portion arranged in a second space below the first space and continuous with the first battery accommodating portion, and batteries accommodated in the first and second battery accommodating portions. The support device includes a frame-side bracket having first brackets extending from each of the side rails outward in a vehicle width direction and downward and a second bracket connecting the first brackets to each other below the battery pack, a battery-side bracket projecting from an end surface on an outer side in the vehicle width direction of the second battery accommodating portion outward in the vehicle width direction, and an elastic (Continued)

coupling portion elastically connecting the frame-side bracket and the battery-side bracket.

11 Claims, 7 Drawing Sheets

(51) Int. Cl.
*H01M 50/204* (2021.01)
*H01M 50/249* (2021.01)
*H01M 50/262* (2021.01)

(52) U.S. Cl.
CPC ....... *H01M 50/249* (2021.01); *H01M 50/262* (2021.01); *B60K 2001/0438* (2013.01); *H01M 2220/20* (2013.01)

(56) References Cited

U.S. PATENT DOCUMENTS

| | | | | |
|---|---|---|---|---|
| 2013/0126255 | A1 | 5/2013 | Saeki | |
| 2018/0062125 | A1* | 3/2018 | Kaneshige | ............... B60K 1/04 |
| 2019/0009661 | A1* | 1/2019 | Okamura | ............ H01M 50/249 |
| 2019/0276081 | A1 | 9/2019 | Otoguro et al. | |
| 2021/0024131 | A1* | 1/2021 | Baccouche | ............ B62D 21/15 |
| 2021/0039716 | A1* | 2/2021 | Sasaoka | ............... B62D 27/065 |
| 2021/0146765 | A1* | 5/2021 | Menon | ..................... B60K 1/04 |
| 2021/0188069 | A1* | 6/2021 | Friedman | ............... B62D 27/06 |
| 2021/0362579 | A1* | 11/2021 | Kumagai | ............... B62D 21/02 |
| 2022/0250458 | A1* | 8/2022 | Kimura | .................. B62D 53/02 |
| 2022/0320661 | A1* | 10/2022 | Yoshida | .................... B60K 1/04 |

FOREIGN PATENT DOCUMENTS

| | | |
|---|---|---|
| JP | 2013-107541 A | 6/2013 |
| JP | 2016-113063 A | 6/2016 |
| JP | 2018-43546 A | 3/2018 |
| JP | 2018-103765 A | 7/2018 |
| JP | 2019-156030 A | 9/2019 |
| JP | 2019-189169 A | 10/2019 |
| WO | WO 2018/123337 A1 | 7/2018 |
| WO | WO 2019/208749 A1 | 10/2019 |
| WO | WO 2019/208750 A1 | 10/2019 |
| WO | WO 2020/003835 A1 | 1/2020 |

OTHER PUBLICATIONS

English-language European Extended Search Report issued in European application No. 20885582.5-1012 / 4056456 PCT/JP2020032288 dated Jan. 2, 2023 (Nine (9) pages).
International Preliminary Report on Patentability (PCT/IB/373) and Written Opinion (PCT/ISA/237) dated May 10, 2022 (Five (5) pages).
PCT/JP2020/032288, International Search Report dated Nov. 2, 2020 (Three (3) pages).

* cited by examiner

SUPPORT DEVICE FOR VEHICLE BATTERY PACK AND ELECTRIC VEHICLE

TECHNICAL FIELD

The present disclosure relates to a support device for supporting a battery pack in a vehicle having a ladder frame, and to an electric vehicle provided with the support device.

BACKGROUND ART

Conventionally, from the viewpoint of reducing environmental loads, electric vehicles, such as electric vehicles (EVs) or hybrid vehicles (HEVs), have been developed which travel by supplying electric power of a driving battery to a motor. In recent years, electric vehicles have also been developed in the field of commercial vehicles such as trucks (see, for example, Patent Document 1).

Since commercial vehicles are, in general, heavier than passenger cars, electric vehicles serving as commercial vehicles are required to increase the capacitance of a battery pack composed of multiple batteries in order to secure a cruising range. Since the battery pack tends to become larger as the capacitance increases, a battery pack is mounted between a pair of side rails in a vehicle having a ladder frame because of the layout.

PRIOR ART DOCUMENTS

Patent Document

[Patent Document 1] Japanese Laid-open Patent Publication No. 2016-113063

SUMMARY OF INVENTION

Problem to be Solved by Invention

In accordance with increasing the size of a battery pack, the battery pack, which is disposed between the pair of side rails, may project to the space below the side rails beyond the space between the side rails. In such a battery pack, a portion arranged at the space below the side rails is less protected than the portion arranged at the space between the side rails in the event of a side collision of the vehicle. Accordingly, a demand for a technique to enhance the protectability of a battery pack arises.

The present disclosure has been made in view of the above problems, and an object thereof is to improve the protectability of a battery pack.

Means to Solve Problems

The present disclosure has been made to solve at least a part of the above problems, and can be realized as the following aspects or application examples.

(1) A support device for a vehicle battery pack according to this application example is configured to support a battery pack including: a first battery accommodating portion arranged in a first space between a pair of side rails constituting a ladder frame of a vehicle; a second battery accommodating portion arranged in a second space below the first space and continuous with the first battery accommodating portion; and batteries accommodated in the first battery accommodating portion and the second battery accommodating portion, and is characterized by including: a frame-side bracket having first brackets extending from each of the side rails outward in a vehicle width direction and downward, and a second bracket connecting the first brackets to each other below the battery pack; a battery-side bracket projecting from an end surface on an outer side in the vehicle width direction of the second battery accommodating portion outward in the vehicle width direction; and an elastic coupling portion elastically connecting the frame-side bracket and the battery-side bracket.

By providing the frame-side bracket, in the event of a side collision of the vehicle, the impact force is absorbed by the first bracket on the collision side before the impact force is input into the second battery accommodating portion. The impact force input into the first bracket on the collision side is further transmitted to the first bracket on the opposite side (non-collision side) through the second bracket, and is absorbed by the entire frame-side bracket. As a result, the impact force to be input into the second battery accommodating portion is reduced. In addition, since the deformation of the ladder frame is suppressed by the absorption of the impact force by the frame-side bracket as described above, the impact force to be input into the first battery accommodating portion is also reduced. Therefore, the protectability of the battery pack is improved.

In addition, the second bracket provided below the battery pack facilitates protection of the battery pack against scattered objects from road surfaces.

Further, since the support device can be subassembled (integrated) with the battery pack before being assembled to the side rails, by subassembling the support device and the battery pack before assembling these to the side rails, the assemblability of the battery pack is improved.

(2) In the support device for the vehicle battery pack according to the present application example, each one of the first brackets may have flange portions respectively protruding outward in the vehicle width direction from a front edge and a rear edge thereof.

Since the strength and rigidity of the first brackets provided with such flange portions are improved, the first brackets are less deformed even when subjected to an impact force. Therefore, the protectability of the battery pack is further improved.

(3) In the support device for the vehicle battery pack according to the present application example, the first bracket may include an upper portion fixed to a web of the side rail, an intermediate portion obliquely extending from the upper portion outward in the vehicle width direction and downward, and a lower portion extending downward from the intermediate portion and coupled to the second bracket.

In this manner, in the first bracket, by extending the intermediate portion between the upper portion fixed to the web of the side rail and the lower portion coupled to the second bracket obliquely outward in the vehicle width direction and downward, interference with the second battery accommodating portion can be easily avoided, and the displacement margin of the first bracket can be easily secured. This makes it difficult for the first bracket to come into contact with the second battery accommodating portion even at the time of a side collision of the vehicle, thereby further improving the protectability of the second battery accommodating portion.

(4) In the support device for the vehicle battery pack according to the present application example, the frame-side bracket may include a third bracket protruding inward in the vehicle width direction from the first bracket, and the elastic coupling portion may be fixed to each of the second bracket and the third bracket. As such, the elastic coupling portion, which is fixed to each of the second bracket and the third bracket, is fixed to the frame-side bracket at two points, so that the stability (shape retention) of the elastic coupling portion with respect to the frame-side bracket is improved. Therefore, the battery pack is more stably supported.

(5) In the support device for the vehicle battery pack according to the present application example, the first bracket may have an upper portion fixed to a web of the side rail. The upper portion may have a larger dimension in a vehicle length direction as compared to other portions of the first bracket.

In the first bracket, since the greatest stress is applied to the upper portion which is the attachment portion with the side rail, the dimension in the vehicle length direction of the upper portion is set to be larger than that of other portions, so that the strength and rigidity of the upper portion are ensured while the size of the other portions is suppressed. Therefore, the deformation of the first bracket is suppressed while the weight increase of the support device is suppressed.

(6) In the support device for the vehicle battery pack according to the present application example, the second bracket may have a box-shaped cross section orthogonal to the vehicle width direction.

The second bracket having a box-shaped cross section orthogonal to the vehicle width direction has improved strength and rigidity, and therefore, is less deformable even when subjected to an impact force. Therefore, the protectability of the battery pack is further improved.

(7) In the support device for the vehicle battery pack according to the present application example, the first bracket may have a lightening hole.

The weight of the first bracket provided with the lightening hole is reduced as compared with the one without the lightening hole, and thereby, the lightening hole contributes to the weight reduction of the support device.

(8) In the support device for the vehicle battery pack according to the present application example, the second bracket may have a lightening hole.

The weight of the second bracket provided with the lightening hole is reduced as compared with the one without the lightening hole, thereby contributing to the weight reduction of the support device.

(9) In the support device for the vehicle battery pack according to the present application example, a dimension in the vehicle width direction of the second battery accommodating portion may be larger than that of the first battery accommodating portion.

Compared to the first space between the side rails, the second space below the first space has less restrictions on the dimension in the vehicle width direction. For this reason, by setting the dimension in the vehicle width direction of the second battery accommodating portion arranged in the second space to be larger than that of the first battery accommodating portion, the battery capacity is increased while the layout facility of the battery pack is secured.

On the other hand, in such a battery pack, the second battery accommodating portion is liable to receive an impact force from the outside in the vehicle width direction at the time of a side collision, but since the impact force to be transmitted to the second battery accommodating portion is reduced by the support device as described above, it is possible to improve the protectability of the battery pack while securing the battery capacity.

(10) In the support device for the vehicle battery pack according to the present application example, a dimension in the vehicle width direction of the second battery accommodating portion may be equal to that of the first battery accommodating portion.

If the first battery accommodating portion and the second battery accommodating portion have the same dimension in the vehicle width direction, the shape of the battery pack is simplified. In addition, since the second battery accommodating portion is located on the inner side of the side rail in the vehicle width direction and is positioned separately from the first bracket, the impact force is less transmittable to the second battery accommodating portion at the time of a side collision. Therefore, the protectability of the second battery accommodating portion is improved.

(11) An electric vehicle according to the present application example is characterized by including the support device for the vehicle battery pack described above.

In such an electric vehicle, the protectability of the battery pack is improved by the provided support device for the vehicle battery pack.

Effect of Invention

According to the present disclosure, the protectability of the battery pack can be enhanced.

DESCRIPTION OF EMBODIMENT(S)

Figure 1:
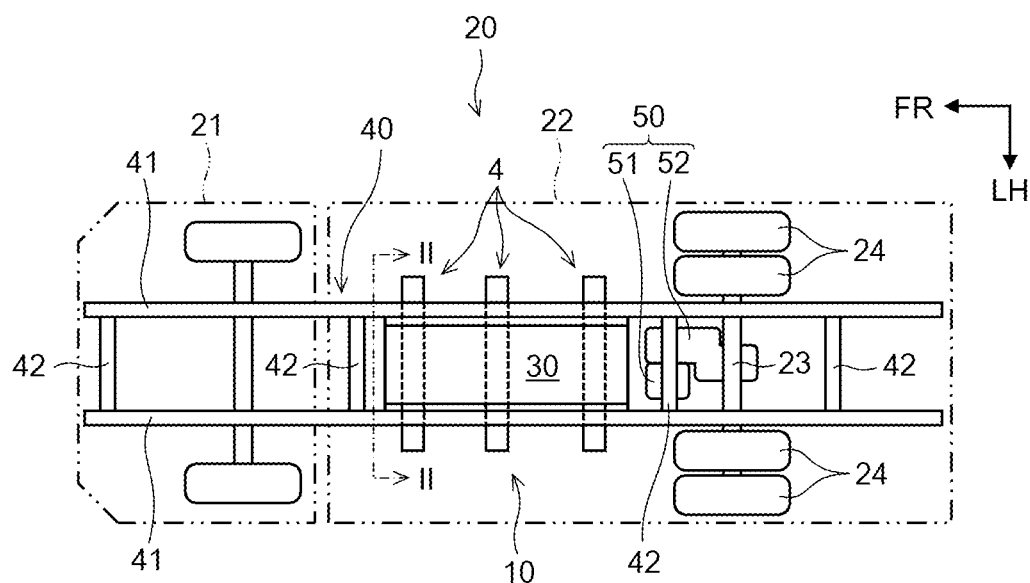
FIG. 1 is a top view schematically showing the entire configuration of an electric vehicle including a support device for a vehicle battery pack according to an embodiment.

Referring to the drawings, a support device for a vehicle battery pack and an electric vehicle according to an embodiment will now be described. The following embodiment is illustrative only and are not intended to preclude the application of various modifications and techniques not explicitly set forth in this embodiment. The configurations of the following embodiment may be variously modified and implemented without departing from the scope thereof. Also, the configurations can be selected as necessary, or can be combined in an appropriate manner.

[1. Configuration]

[1-1. Overall Configuration]

The support device 10 for a vehicle battery pack (hereinafter, simply referred to as "support device 10") according to the present embodiment is applied to a vehicle 20 shown in FIG. 1. Hereinafter, the direction in which the vehicle 20 travels forward is referred to as a forward direction (FR), the opposite direction to the forward direction is referred to as a rearward direction, and the forward-backward direction is also referred to as a vehicle length direction. Further, a left direction (LH) and a right direction are defined with reference to the state of the vehicle 20 directing to the front, and the left-right direction is also referred to as a vehicle width direction. Further, a direction orthogonal to both the vehicle length direction and the vehicle width direction is also referred to as a vehicle height direction, and an upward direction (UP) and a downward direction are defined along the vehicle height direction.

The vehicle 20 of the present embodiment is an electric vehicle including a battery pack 30 and the support device 10 supporting the battery pack 30. Here, the vehicle 20 is assumed to be a truck (electric truck).

The vehicle 20 includes a ladder-shaped ladder frame 40 and a driving device 50 for driving the vehicle 20 with the electric power of the battery pack 30. In FIG. 1, a cab 21 in which a driver's seat is provided and a cargo box 22 arranged behind the cab 21 are indicated by two-dotted chain lines.

The ladder frame 40 is a structural member that supports heavy objects such as the battery pack 30, the driving device 50, the cab 21, and the cargo box 22. The ladder frame 40 includes a pair of side rails 41 extending in the vehicle length direction and a plurality of cross members 42 extending in the vehicle width direction. The pair of side rails 41 are disposed apart from each other in the vehicle width direction. Each of the cross members 42 is disposed between the pair of side rails 41 and connects the side rails 41 to each other.

The driving device 50 includes a motor unit 51 that operates with the electric power of the battery pack 30, and a gear unit 52 that a rotational force is transmitted to from the motor unit 51. Here, the driving device 50 disposed between the pair of side rails 41 is illustrated.

The gear unit 52 includes a reduction mechanism and/or a differential mechanism that are well known, and reduces the speed of a rotational force transmitted from the motor unit 51 as required, and then transmits the rotational force to the left and right rear wheels (driving wheels) 24 via a rear axle 23. The vehicle 20 travels as the driving device 50 transmits the rotational force to the rear wheels 24 as described above.

Figure 2:
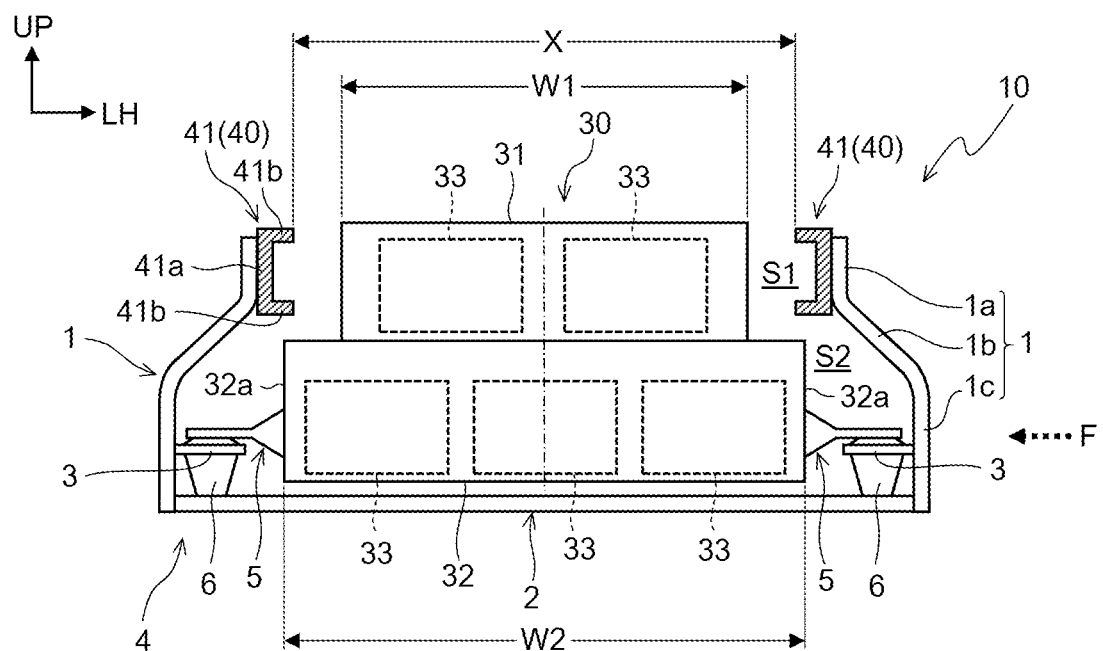
FIG. 2 is a schematic cross-sectional view (a cross-sectional view taken along the II-II arrows of FIG. 1) of the support device of FIG. 1 and its surroundings as viewed from the front.

The battery pack 30 is a relatively large and large-capacity rechargeable battery, and is disposed between the pair of side rails 41 and in front of the driving device 50. As shown in FIG. 2, the battery pack 30 includes a first battery accommodating portion 31 and a second battery accommodating portion 32 arranged along the vehicle height direction, and multiple batteries 33 accommodated in each of the first battery accommodating portion 31 and the second battery accommodating portion 32.

The present embodiment exemplifies the battery pack 30 having each of the first battery accommodating portion 31 and the second battery accommodating portion 32 in the form of rectangular parallelepiped. The first battery accommodating portion 31 is disposed in a first space S1 between the pair of side rails 41. As compared to this, the second battery accommodating portion 32 is disposed in a second space S2 below the first space S1, and is continuous with the first battery accommodating portion 31.

Here, the first space S1 is a space hidden by the side rails 41 in a side view (seen along the vehicle width direction) of the vehicle 20. The second space S2 is a space below the side rails 41 and is not hidden by the side rails 41 in a side view of the vehicle 20.

The first battery accommodating portion 31 of the present embodiment is disposed at least partially in the first space S1, and at least partially overlaps with the side rails 41 in a side view of the vehicle 20. Further in the present embodiment, entire second battery accommodating portion 32 is disposed in the second space S2, and does not overlap with any one of the side rails 41 in a side view of the vehicle 20.

The first battery accommodating portion 31 of the present embodiment is placed on the second battery accommodating portion 32. The first battery accommodating portion 31 and the second battery accommodating portion 32 are fixed to each other.

In the present embodiment, the dimension W2 in the vehicle width direction of the second battery accommodating portion 32 is set to be larger than the dimension W1 in the vehicle width direction of the first battery accommodating portion 31. Here, an example is shown in which the dimension W1 in the vehicle width direction of the first battery accommodating portion 31 is smaller than the distance X between the pair of side rails 41 (W1<X) and the dimension W2 in the vehicle width direction of the second battery accommodating portion 32 is larger than the distance X described above (W2>X).

More specifically, the distance X between the pair of side rails 41 is a distance based on the tips (protruding ends) of flanges 41b protruding inward in the vehicle width direction from top and bottom edges of a plate-shaped web 41a extending along the vehicle length direction and the vehicle height direction in each of the side rails 41. Therefore, the above-mentioned distance X corresponds to the length in the vehicle width direction between the right end of the flange 41b in the side rail 41 on the left and the left end of the flange 41b in the side rail 41 on the right.

The first battery accommodating portion 31 and the second battery accommodating portion 32 are arranged so that the center lines (see the one-dotted chain line in FIG. 2) of the vehicle width direction of the both portions 31 and 32 coincide with each other. As a result, the battery pack 30 has a T-shape in which the upper and lower sides are reversed (an inverted T-shape) in a front view (when seen along the vehicle length direction).

The multiple batteries 33 are connected in series and function as a power source for driving the vehicle 20. The number and arrangement of the batteries 33 are not particularly limited, and can be appropriately changed according to, for example, the quantity of electric power required to drive the vehicle 20, the dimensions and characteristics of the batteries 33, and so on.

[1-2. Configuration of Main Parts]

Hereinafter, the support device 10 will be described in detail.

The support device 10 includes frame-side brackets 4 coupled to the ladder frame 40, battery-side brackets 5 coupled to the battery pack 30, and elastic coupling portions 6 elastically coupling the frame-side brackets 4 and the battery-side brackets 5. The support device 10 elastically supports the battery pack 30 with respect to the ladder frame 40 by the configuration in which the frame-side brackets 4 and the battery-side brackets 5 are connected to each other via the elastic coupling portions 6, so that vibrations transmitted from the ladder frame 40 to the battery pack 30 is reduced.

In this embodiment, the support device 10 in which three frame-side brackets 4 are disposed at intervals along the vehicle length direction is illustrated. Two battery-side brackets 5 and two elastic coupling portions 6 are provided for each frame-side bracket 4 (on the left and right sides). Therefore, the battery pack 30 of the present embodiment is attached to the ladder frame 40 via six elastic coupling portions 6 fixed to each of the six battery-side brackets 5 and three frame-side brackets 4 connected to the elastic coupling portions 6. The support device 10 of the present embodiment is formed symmetrically.

Figure 3:
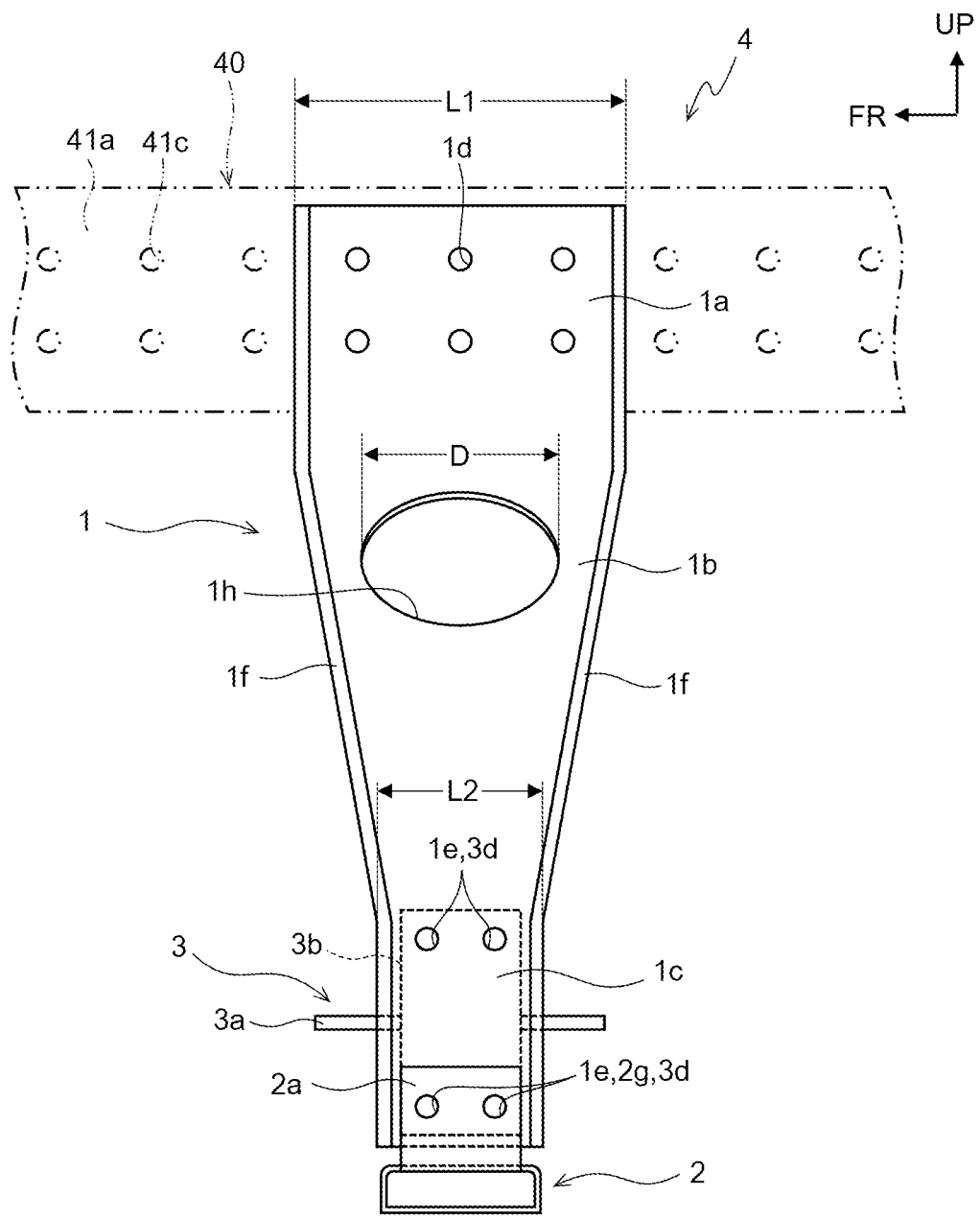
FIG. 3 is a view of a frame-side bracket of the support device shown in FIG. 1 as viewed from the outer side in a vehicle width direction.

As shown in FIGS. 2 and 3, each of the frame-side brackets 4 has a pair of first brackets 1 which are respectively connected to the pair of side rails 41, a second bracket 2 that connects the first brackets 1 to each other below the battery pack 30, and a pair of third brackets 3 which are respectively protruding from the pair of first brackets 1. The first brackets 1, the second bracket 2 and the third brackets 3 are formed by, for example, pressing steel plates.

The first bracket 1 is provided so as to extend outward in the vehicle width direction and downward from each of the side rails 41. Each first bracket 1 of the present embodiment has an upper portion 1a fixed to the web 41a, an intermediate portion 1b extending obliquely outward in the vehicle width direction and downward from the upper portion 1a, and a lower portion 1c extending downward from the intermediate portion 1b.

The lower portion 1c is arranged so as to shifts outward in the vehicle width direction with respect to the upper portion 1a. The intermediate portion 1b extends obliquely downward so as to be away from the second battery accommodating portion 32 of the battery pack 30, and connects the upper portion 1a to the lower portion 1c. The portion between the upper portion 1a and the intermediate portion 1b and the portion between the intermediate portion 1b and the lower portion 1c are smoothly curved.

As shown in FIG. 3, the upper portion 1a and the lower portion 1c respectively have multiple through-holes 1d and 1e through which fasteners such as bolts (not shown) are inserted. The upper portion 1a is disposed on the outer side of the web 41a of the side rail 41, and is coupled to the web 41a by fasteners inserted through the through-holes 1d. The web 41a is provided with multiple through-holes 41c that come to overlap with the through-holes 1d of the upper portion 1a.

The lower portion 1c is coupled to each of the second bracket 2 and the third bracket 3 by fasteners placed through the through-holes 1e. Here, two through-holes 1e arranged along the vehicle length direction are illustratively provided in two vertical rows.

In the first bracket 1 of the present embodiment, the dimension L1 in the vehicle length direction of the upper portion 1a is set to be larger than the dimensions in the vehicle length direction of other portions (specifically, the intermediate portion 1b and the lower portion 1c). Here, the upper portion 1a has a rectangular shape when viewed along the vehicle width direction, and has a uniform dimension L1 in the vehicle length direction. Further, the intermediate portion 1b and the upper half portion of the lower portion 1c have dimensions in the vehicle length direction gradually reducing as approaching the bottom. Further, the lower half of the lower portion 1c has a rectangular shape when viewed along the vehicle width direction, and has a uniform dimension L2 (L2<L1) in the vehicle length direction. Accordingly, the dimension in the vehicle length direction of the first bracket 1 is the largest (L1) at the upper portion 1a and the smallest (L2) at the lower half of the lower portion 1c.

Figure 4:
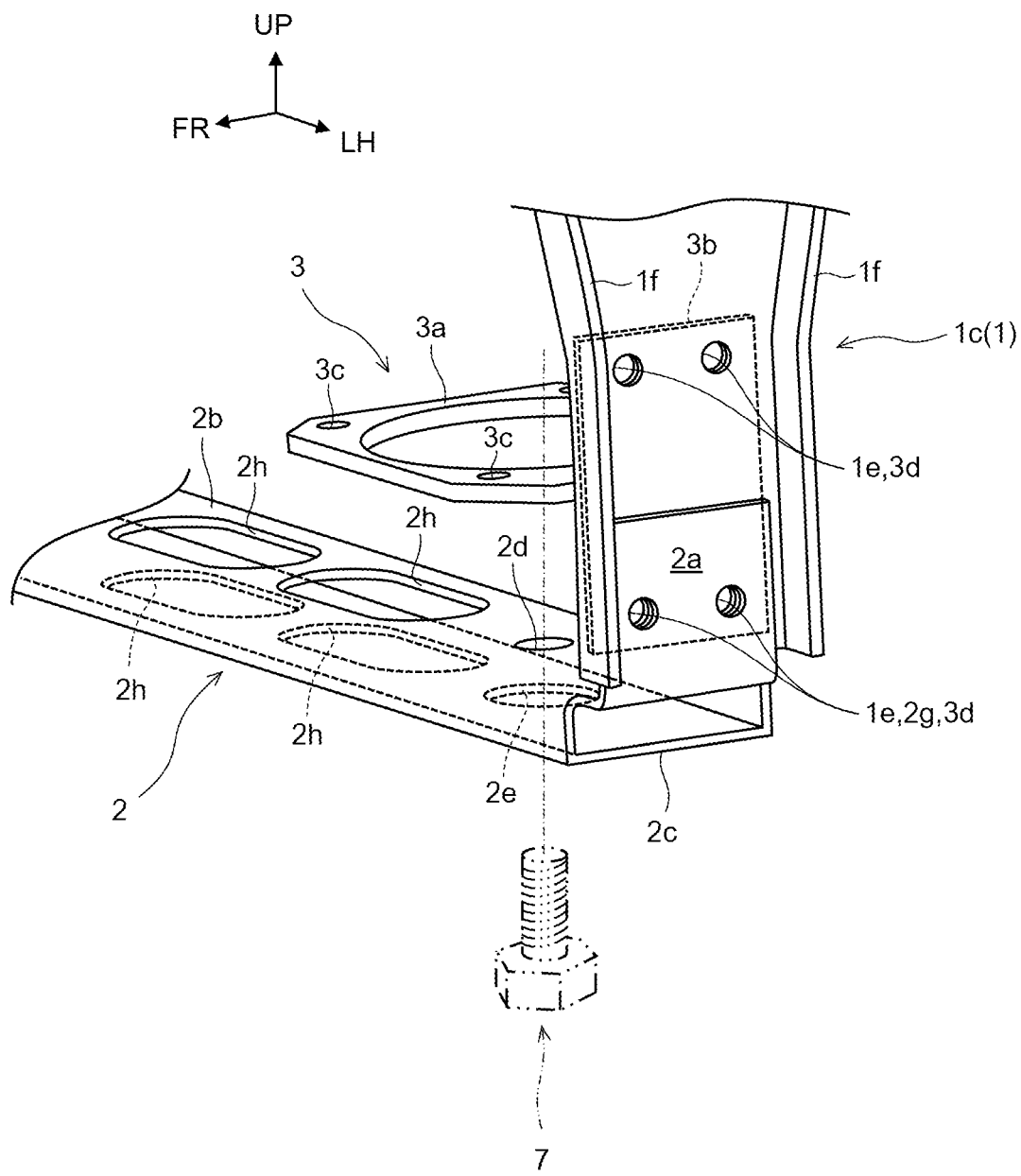
FIG. 4 is a perspective view of the main part of the frame-side bracket shown in FIG. 3 (seen from the outer side in the vehicle width direction and the front side).

As shown in FIGS. 3 and 4, the first bracket 1 of the present embodiment has flange portions 1f respectively protruding outward in the vehicle width direction from the front edge and the rear edge of the first bracket 1. With this configuration, the first bracket 1 has a C-shaped horizontal cross-section (a cross-section along the vehicle length direction and the vehicle width direction).

As shown in FIG. 3, the first bracket 1 of the present embodiment has a lightening hole 1h. Here, a circular lightening hole 1h formed through the intermediate portion 1b is exemplified. The diameter (hole diameter) D of the lightening hole 1h of the present embodiment is set to be larger than the smallest dimension L2 in the vehicle length direction of the first bracket 1.

The second bracket 2 extends in the vehicle width direction. The second bracket 2 of the present embodiment has a cross section perpendicular to the vehicle width direction in the form of a box (closed cross section). In this manner, the second bracket 2 is formed in a hollow-like shape. Incidentally, the second bracket 2, in a state where the battery pack 30 is supported by the support device 10 (i.e., a state where the frame-side bracket 4 and the battery-side bracket 5 are connected via the elastic coupling portion 6), is provided so as to have a gap from the battery pack 30.

Left and right end parts 2a of a top surface part 2b of the second bracket 2 are bent substantially vertically upward. These end parts 2a are provided with through-holes 2g formed so as to overlap with the through-holes 1e formed on the lower portion 1c of the corresponding first bracket 1.

As shown in FIG. 4, the second bracket 2 of the present embodiment has multiple lightening holes 2h arranged in the vehicle width directions. Here, oval-shaped lightening holes 2h formed through each of the top surface part 2b and a lower surface part 2c of the second bracket 2 are exemplified.

Through-holes 2d through which fasteners 7 for fixing the elastic coupling portion 6 are inserted are formed at both right and left ends of the top surface part 2b of the second bracket 2. Access holes 2e for inserting the fasteners 7 into the through-holes 2d from the bottom are formed at both left and right ends of the lower surface part 2c of the second bracket 2.

The third brackets 3 are components for attaching the elastic coupling portions 6 to the respective first brackets 1, and are protruding from each first bracket 1 inwardly in the vehicle width direction. Each third bracket 3 has a ring portion 3a formed in a ring shape surrounding the periphery of the elastic coupling portion 6 and a mounting portion 3b formed into a flat plate shape substantially perpendicular to the ring portion 3a.

The ring portion 3a is provided with through-holes 3c through which fasteners (not shown) for fixing the elastic coupling portion 6 are inserted. The mounting portion 3b is provided with through-holes 3d through which fasteners (not shown) for fixing the third bracket 3 to the first bracket 1 are inserted.

With respect to the lower portion 1c of the first bracket 1, the end part 2a of the second bracket 2 is disposed on the outer side in the vehicle width direction, and the mounting portion 3b of the third bracket 3 is disposed on the inner side in the vehicle width direction. The first bracket 1, the second bracket 2, and the third bracket 3 are arranged so that the lower through-holes 1e in the lower portion 1c of the first bracket 1, the through-holes 2g in the end part 2a of the second bracket 2, and the through-holes 3d in the mounting portion 3b of the third bracket 3 are aligned (communicated) in the vehicle width direction, and are then joined (fastened together) by the fasteners inserted into these through-holes.

In addition, the first bracket 1 and the third bracket 3 are arranged so that the upper through-holes 1e in the lower portion 1c of the first bracket 1 and the through-holes 3d in the mounting portion 3b of the third bracket 3 are aligned (communicated) in the vehicle width direction, and are also joined (fastened together) by the fasteners inserted into these through-holes. Under the state where the third bracket 3 is coupled to the first bracket 1, the ring portion 3a is arranged coaxially with the through-hole 2d of the second bracket 2.

Figure 5:
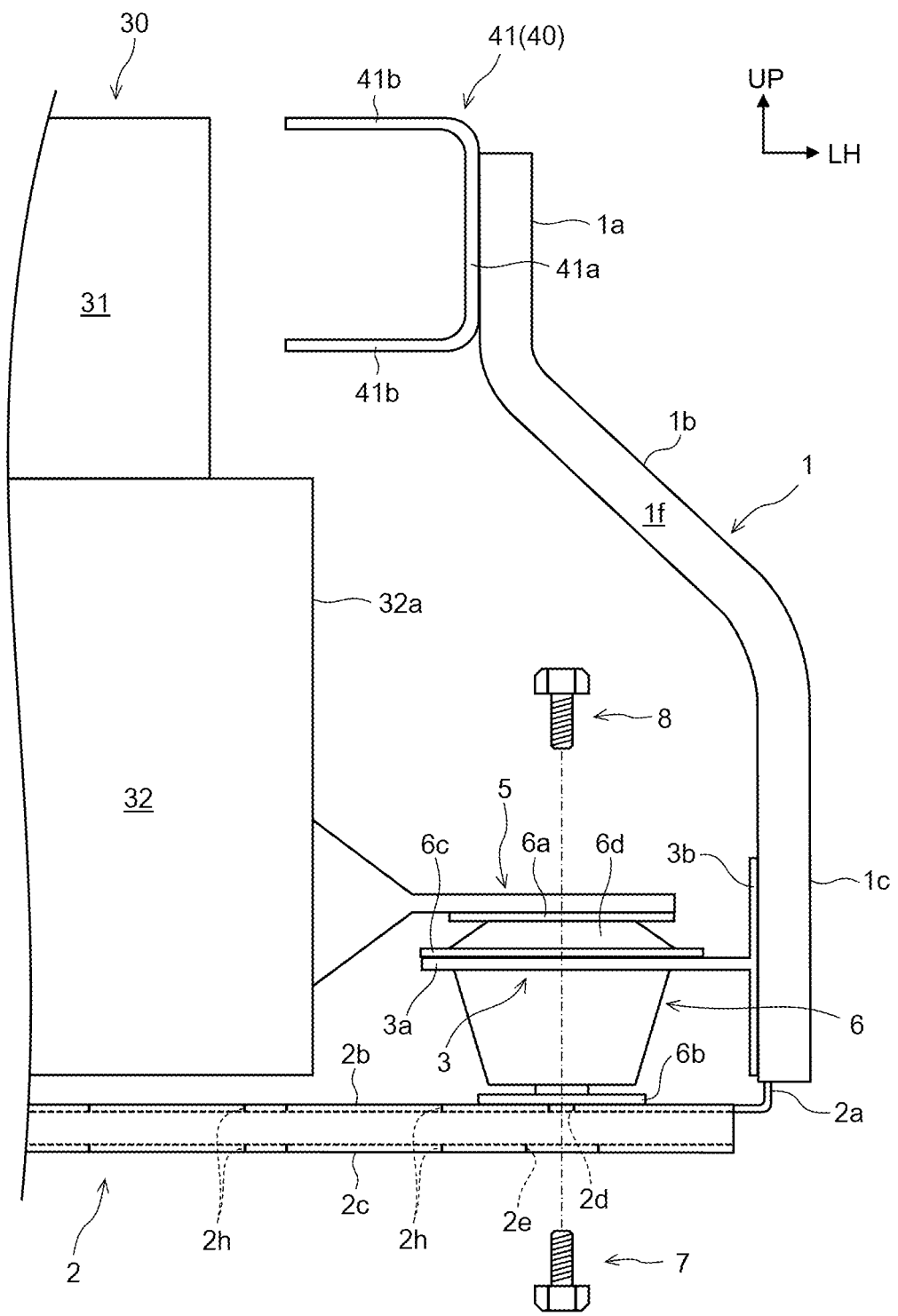
FIG. 5 is an enlarged exploded view of the main part of FIG. 2.
Figure 6A:
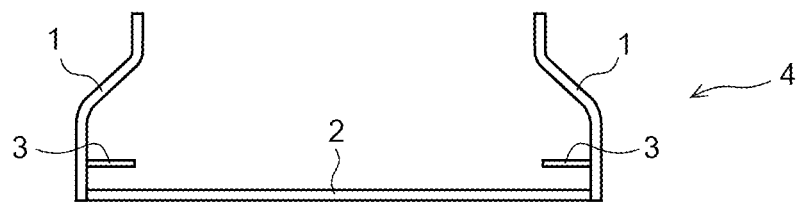
FIGS. 6(*a*) to 6(*d*) are schematic diagrams for explaining assembly procedures of the support device of FIG. 1.
Figure 6B:
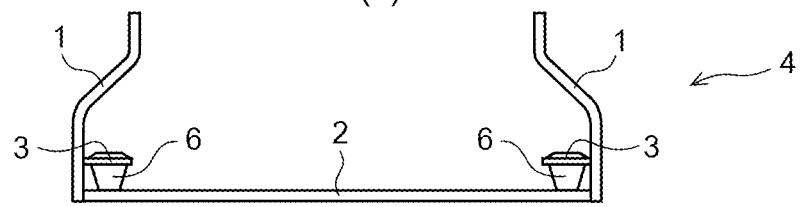
Figure 6C:
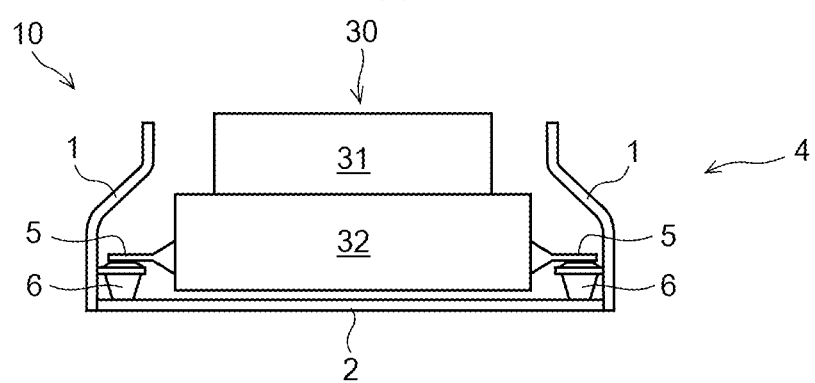
Figure 6D:
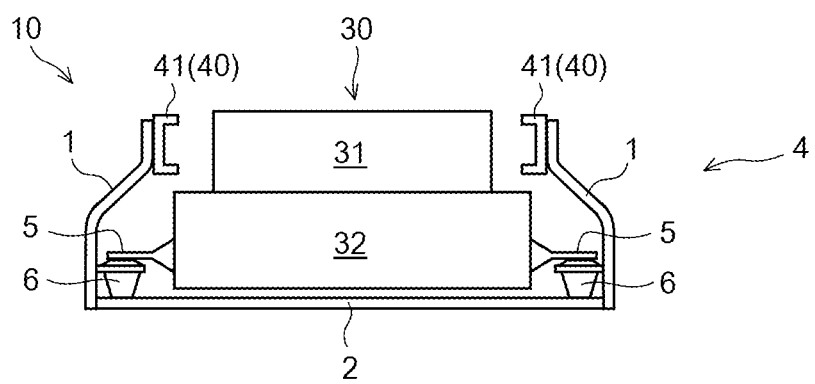

As shown in FIG. 5, the battery-side bracket 5 projects outward in the vehicle width direction from an end surface 32a on the outer side in the vehicle width direction of the second battery accommodating portion 32. The battery-side bracket 5 is provided with a through-hole (not shown) through which a fastener 8 for fixing the elastic coupling portion 6 is inserted.

The elastic coupling portion 6 is, for example, a rubber bush, and is configured to include an elastic member 6d having a substantially cylindrical shape or a substantially truncated cone-shape. The elastic coupling portion 6 absorbs external forces inputted in various directions (the vehicle length direction, the vehicle width direction, the vehicle height direction, and composite directions combining these directions).

The elastic coupling portion 6 is disposed on the second bracket 2 and between the first bracket 1 and the second battery accommodating portion 32. The elastic coupling portion 6 of the present embodiment has a first fixing part 6a to which the battery-side bracket 5 is fixed, a second fixing part 6b to which the second bracket 2 is fixed, and a third fixing part 6c to which the third bracket 3 is fixed.

Each of these fixing parts 6a, 6b, 6c has a flat plate shape extending substantially perpendicularly to the axial direction of the elastic member 6d (see the one-dotted chain line in FIG. 5), and is attached to the elastic member 6d. More specifically, the first fixing part 6a and the second fixing parts 6b are each attached to one of the both axial ends of the elastic member 6d, and the third fixing part 6c is attached between the first fixing part 6a and the second fixing part 6b (at the intermediate portion in the axis direction of the elastic member 6d).

A through-hole (not shown) through which the fastener 8 is inserted is formed on the first fixing part 6a. Similarly, a through-hole (not shown) through which the fastener 7 is inserted is formed in the second fixing part 6b. Through-holes (not shown) overlapping with the respective through-holes 3d formed on the ring portion 3a of the third bracket 3 are formed on the third fixing part 6c.

The elastic coupling portion 6 is disposed on the ring portion 3a of the third bracket 3 from the upper side (i.e., from the side of the upper portion 1a of the first bracket) in such an attitude that the first fixing part 6a is above the second fixing part 6b. Then, the elastic coupling portion 6 is fixed to the second bracket 2 by the fastener 7 which is inserted into the through-hole 2d through the access hole 2e under a state where the second fixing part 6b is superimposed on the top surface part 2b of the second bracket 2. The elastic coupling portion 6 is fixed to the third bracket 3 by the fasteners inserted through the through-holes 3c of the ring portion 3a under a state where the third fixing part 6c is superimposed on the ring portion 3a. Further, the elastic coupling portion 6 is fixed to the battery-side bracket 5 by the fastener 8 inserted through the through-hole of the battery-side bracket 5 under a state where the battery-side bracket 5 is superposed on the first fixing part 6a.

As described above, the elastic coupling portion 6 of the present embodiment is fixed to each of the second bracket 2 and the third bracket 3 by the second fixing part 6b and the third fixing part 6c, respectively. Therefore, the elastic coupling portion 6 is fixed to the battery-side bracket 5 at one point of the first fixing part 6a, and is fixed to the frame-side bracket 4 at two points of the second fixing part 6b and the third fixing part 6c.

The elastic coupling portion 6 is thus fixed to each of the frame-side bracket 4 and the battery-side bracket 5, and thereby elastically connects the frame-side bracket 4 and the battery-side bracket 5 to each other. The fixing method of the elastic coupling portion 6 is not limited to the method using the fasteners 7 and 8. Alternatively, a method of fitting concavities and convexities provided in portions of the elastic coupling portion 6 may be adopted.

A procedure for assembling the support device 10 (i.e., a procedure for assembling the battery pack 30 to the ladder frame 40 via the support device 10) will be described by referring to FIG. 6.

As shown in FIG. 6(*a*), first of all, the frame-side bracket 4 is assembled by integrating the first brackets 1, the second bracket 2, and the third bracket 3. As described above, three frame-side brackets 4 are prepared for the battery pack 30 of the present embodiment.

Next, as shown in FIG. 6(*b*), two elastic coupling portions 6 are attached to each of the frame-side brackets 4. At this time, each elastic coupling portion 6 is fixed to the second bracket 2 and corresponding one of the third brackets 3.

Thereafter, as shown in FIG. 6(*c*), the battery-side brackets 5 provided on the battery pack 30 and the frame-side brackets 4 to which the elastic coupling portions 6 are attached are connected. Specifically, the six elastic coupling portion 6 attached to the three frame-side brackets 4 are positioned and fixed to the six battery-side brackets 5 provided on the battery pack 30. At this time, the relative positions of the pair of elastic coupling portions 6 attached to each of the frame-side bracket 4 do not change, which makes it easy to position the battery-side brackets 5 with respect to the elastic coupling portions 6.

Then, when all of the battery-side brackets 5 are connected to the frame-side bracket 4 through the elastic coupling portions 6, the sub-assembly (integration) of the battery pack 30 and the support device 10 is completed. In this manner, the support device 10 is subassembled with the battery pack 30 prior to being attached to the ladder frame 40.

Then, as shown in FIG. 6(*d*), the frame-side brackets 4 included in the support device 10 subassembled with the battery pack 30 are attached to the side rails 41. As a result, the battery pack 30 is attached to the ladder frame 40 via the support device 10, and the assembly of the battery pack 30 to the ladder frame 40 is completed.

[2. Functions and Effects]

The support device 10 and the vehicle 20 including the support device 10 obtain the following functions and effects.

As shown by the chain line in FIG. 2, in the event of a side collision (in the example of FIG. 2, the left side collision) of the vehicle 20, the impact force F is input into the vehicle 20 from the outer side to the inner side in the vehicle width direction. At this moment, since the first battery accommodating portion 31 of the battery pack 30 is disposed in the first space S1 between the side rails 41, the first battery accommodating portion 31 is easily protected by the side rails 41. On the other hand, since the second battery accommodating portion 32 of the battery pack 30 is disposed in the second space S2 below the first space S1, the impact force F is easily input directly (not through the side rail 41) into the second battery accommodating portion 32, and therefore, the second battery accommodating portion 32 is difficult to be protected by the side rail 41.

However, the support device 10 is provided with the frame-side brackets 4 having the first brackets 1 respectively extending from the pair of side rails 41 outward in the vehicle width direction and downward, and the second bracket 2 connecting the first brackets 1 to each other below the battery pack 30. With this configuration, the impact force F at the time of the side collision is input to the first bracket 1 on the collision side (the left side of the vehicle 20 in the example of FIG. 2) prior to being input into the second battery accommodating portion 32. As a result, direct input of the impact force F into the second battery accommodating portion 32 is avoided, so that the second battery accommodating portion 32 is easily protected.

When the first bracket 1 is displaced inward by the impact force F, the impact force F is absorbed also by the elastic coupling portion 6 positioned between the first bracket 1 and the second battery accommodating portion 32. Because of this, the impact force F to be input into the second battery accommodating portion 32 is further reduced.

The impact force F inputted to the first bracket 1 on the collision side is transmitted to the first bracket 1 on the other side (the non-collision side, the right side of the vehicle 20 in the example of FIG. 2) through the second bracket 2. At this moment, since the second bracket 2 functions like a tension rod, the deformation of the frame-side bracket 4 is suppressed, and the impact force F is absorbed by the entire frame-side bracket 4.

Accordingly, the impact force F is absorbed not only by the ladder frame 40 but also by the frame-side bracket 4 of the support device 10 in the event of the side collision of the vehicle 20. Therefore, in the vehicle 20 described above, the deformation of the ladder frame 40 is suppressed as compared with a vehicle that is not provided with the support device 10.

(1) As described above, according to the support device 10, since the impact force F at the time of a side collision is absorbed by the frame-side bracket 4, the impact force F to be transmitted to the second battery accommodating portion 32 can be reduced. In addition, since the deformation of the ladder frame 40 is suppressed by the frame-side bracket 4 absorbing the impact force F in this manner, the side rails 41 can be prevented from being displaced inward in the vehicle width direction and from being brought into contact with the first battery accommodating portion 31. As a result, the impact force F to be transmitted to the first battery accommodating portion 31 can also be reduced. This can enhance the protectability of the battery pack 30.

In addition, the second bracket 2 disposed below the battery pack 30 easily protects the battery pack 30 against scattered objects such as stones and sands scattered from the road surface. This also enhances the protectability of the battery pack 30.

Further, since one frame-side bracket 4 is connected to two battery-side brackets 5, the positioning of the frame-side bracket 4 and the battery-side brackets 5 is facilitated and the positional accuracy thereof is enhanced as compared with a configuration in which one frame-side bracket is connected to one battery-side bracket. In addition, since the support device 10 can be subassembled with the battery pack 30 and then attached to the ladder frame 40, the assemblability of the battery pack 30 to the ladder frame 40 can be enhanced.

(2) Since each first bracket 1 has flange portions 1f respectively protruding outward from the front edge and the rear edge thereof, the strength and the stiffness of the first bracket 1 can be enhanced. This hinders the deformation of the first bracket 1, so that the protectability of the battery pack 30 can be further enhanced.

(3) In each first bracket 1, since the intermediate portion 1b between the upper portion 1a fixed to the web 41a of the side rail 41 and the lower portion 1c coupled to the second bracket 2 extends obliquely outward in the vehicle width direction and downward from the upper portion 1a, the first bracket 1 can easily avoid interfering with the second battery accommodating portion 32. Thereby, even when the second battery accommodating portion 32 protrudes outward of the side rails 41 in the vehicle width direction, it is easy to arrange the first bracket 1 with a gap from the second battery accommodating portion 32. As a result, even if the first bracket 1 is displaced inward in the vehicle width direction by the impact force F at the time of a side collision, the first bracket 1 is less contactable with the second battery accommodating portion 32, so that the protectability of the second battery accommodating portion 32 can be further enhanced.

(4) Since the third bracket 3 protruding inward in the vehicle width direction from the lower portion 1c of the first bracket 1 is provided and the elastic coupling portion 6 is fixed to both the second bracket 2 and the third bracket 3, the elastic coupling portion 6 can be fixed to the frame-side bracket 4 at two points. As a result, the stability (shape keepability) of the elastic coupling portion 6 with respect to the frame-side bracket 4 is improved, so that the battery pack 30 can be supported more stably. Therefore, the reliability of the battery pack 30 is enhanced.

(5) In each first bracket 1, the upper portion 1a, which is the mounting portion to the web 41a of the side rail 41, tends to be subjected to the largest stress. In the first bracket 1 described above, since the dimension L1 in the vehicle length direction of the upper portion 1a is larger than the dimensions in the vehicle length direction of the other portions, the strength and stiffness of the upper portion 1a can be ensured while the sizes of the parts other than the upper portion 1a are suppressed. Therefore, it is possible to suppress the deformation of the first bracket 1 while suppressing the increase in the weight of the support device 10.

(6) Since the cross section of the second bracket 2 perpendicular to the vehicle width direction is box-shaped, the strength and stiffness of the second bracket 2 against the impact force F in the vehicle width direction can be increased. As a result, the deformation of the second bracket pack 2 is suppressed with respect to the impact force F in a side collision, so that the protectability of the battery pack 30 can be further enhanced.

(7) Since each of the first brackets 1 has the lightening hole 1h, it is possible to contribute to weight reduction of the support device 10. Further, since each first bracket 1 has the above-mentioned flange portions 1f in addition to the lightening hole 1h, it is possible to supplement the strength and stiffness decreased by the presence of the lightening hole 1h with the flange portions 1f while achieving a reduction in weight. Therefore, in the first bracket 1, both reducing of the weight and securing of the strength and the stiffness can be achieved. Further, since the diameter D of the lightening hole 1h is set to be larger than the minimum dimension L2 in the vehicle length direction of the first bracket 1, it is possible to further reduce the weight of the first bracket 1 as compared with the case where the diameter D of the lightening hole 1h is set to be smaller than the minimum dimension L2 of the vehicle length direction.

(8) Since the second bracket 2 has the lightening holes 2h, it is possible to contribute to weight reduction of the support device 10. Further, since the second bracket 2 has the box-shaped cross section perpendicular to the vehicle width direction in addition to the lightening holes 2h, it is possible to supplement the strength and stiffness decreased by the presence of the lightening holes 2h with such sectional configuration while achieving a reduction in weight. Therefore, the second bracket 2 can achieve both reducing of the weight and securing of the strength and the stiffness.

(9) Since the dimension W2 in the vehicle width direction of the second battery accommodating portion 32 is larger than the dimension W1 in the vehicle width direction of the first battery accommodating portion 31, the battery capacity of the battery pack 30 can be increased by effectively utilizing the second space S2, which is less restricted than the first space S1 having a dimension in the vehicle width direction restricted by the side rails 41. Therefore, the battery capacitance can be increased while ensuring the layout capability of the battery pack 30.

On the other hand, the second battery accommodating portion 32 having the dimension W2 in the vehicle width direction larger than the first battery accommodating portion 31 is more likely to receive the impact force F from the outer side in the vehicle width direction in the event of the side collision, but according to the support device 10, the impact force F to be transmitted to the second battery accommodating portion 32 can be reduced by the frame-side bracket 4 as described above. Therefore, the protectability of the battery pack 30 can be enhanced while achieving an increase in the battery capacitance.

[3. Modifications]

Figure 7:
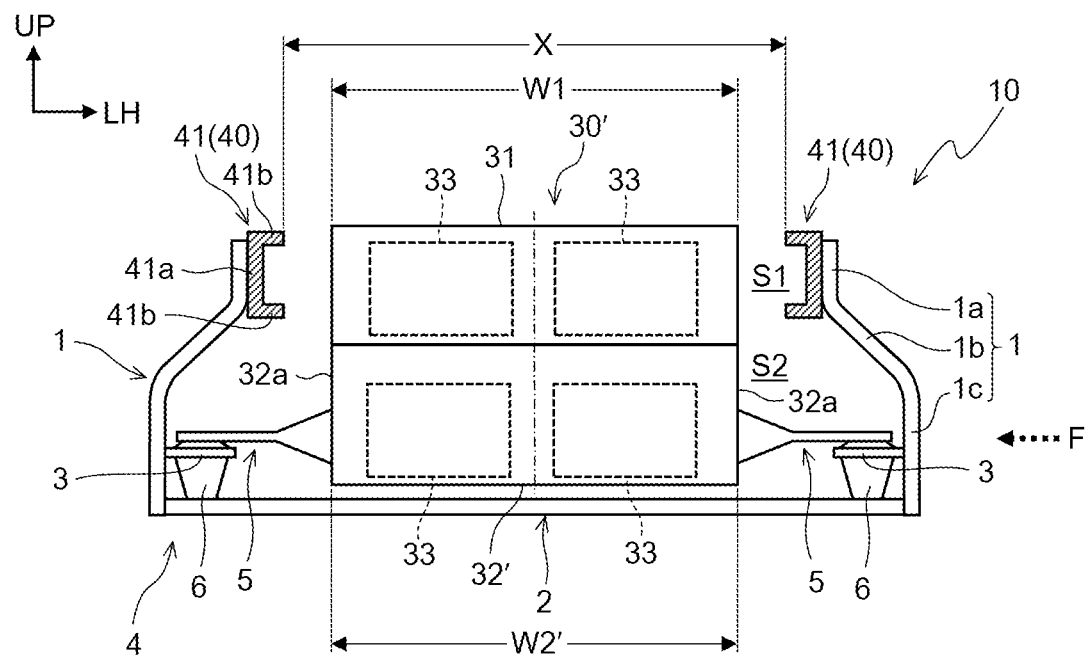
FIG. 7 is a schematic cross-sectional view (a view corresponding to FIG. 2) of the support device of a vehicle battery pack as a modification and its surroundings as viewed from the front.

The battery pack 30 described above is exemplary. Instead of the battery pack 30, the support device 10 may be applied to the battery pack 30' shown in FIG. 7. In FIG. 7, like reference numbers designate the same or corresponding parts and elements, so repetitive description thereof is omitted.

The battery pack 30' of the present modification differs from the battery pack 30 shown in the above embodiment in dimension W2' in the vehicle width direction of the second battery accommodating portion 32'. Specifically, in the battery pack 30', the dimension W2' in the vehicle width direction of the second battery accommodating portion 32' is set to be the same as the dimension W1 in the vehicle width direction of the first battery accommodating portion 31.

Also in the present modification, the first battery accommodating portion 31 and the second battery accommodating portion 32' are arranged such that the center lines (refer to the one-dotted chain line in FIG. 7) of the vehicle width direction thereof coincide with each other. As a result, the battery pack 30' has a rectangular shape in a front view (when seen along the vehicle length direction).

According to the battery pack 30' of the present modification, the shape can be simplified as compared with the battery pack 30 of the above embodiment. In addition, since the second battery accommodating portion 32' is positioned on the inner side of the vehicle width direction of the side rails 41 and is easily apart from the first bracket 1, the impact force F is less transmittable at the time of a side collision. Therefore, the protectability of the second battery accommodating portion 32' can be enhanced.

The battery pack to which the support device 10 is applied may satisfactorily have a first battery accommodating portion disposed in the first space S1, a second battery accommodating portion disposed in the second space S2, and batteries accommodated in these battery accommodating portions, and the specific shapes and dimensions thereof are not particularly limited.

The shapes of the first brackets 1, the second brackets 2, and the third brackets 3 described above are also examples. The shapes of the battery-side brackets 5 described above are also examples.

The third brackets 3 may be omitted. Even with the frame-side bracket 4 in which the third brackets 3 are omitted, in the event of a side collision of the vehicle 20, the impact force F is absorbed by the first bracket 1 before being input into the second battery accommodating portion 32 as described above, and is also transmitted from the first bracket 1 to the second bracket 2 to be absorbed by the entire frame-side bracket 4. Therefore, the protectability of the battery pack can be enhanced similarly to the above embodiment.

The vehicle 20 to which the support device 10 is applied is not limited to an electric vehicle having only the above-mentioned motor unit 51 as a driving source, but may be a hybrid vehicle further including an engine. The support device 10 is applicable to various vehicles including the ladder frame 40, and may be applied to commercial vehicles other than trucks.

DESCRIPTION OF REFERENCE SYMBOLS

1: First bracket
1a: Upper portion
1b: Intermediate portion
1c: Lower portion
1d: Through-hole
1e: Through-hole
1f: Flange portion
1h: Lightening hole
2: Second bracket
2a: End part
2b: Top surface part
2c: Lower surface part
2d: Through-hole
2e: Access hole
2f: Lightening hole
2g: Through-hole
3: Third bracket
3a: Ring portion
3b: Mounting portion
3c: Through-hole
3d: Through-hole
4: Frame-side bracket
5: Battery-side bracket
6: Elastic coupling portion
6a: First fixing part
6b: Second fixing part
6c: Third fixing part
6d: Elastic member
7: Fastener
8: Fastener
10: Support device
20: Vehicle (electric vehicle)
21: Cab
22: Cargo box
23: Rear axle
24: Rear wheel
30,30': Battery pack
31: First battery accommodating portion
32,32': Second battery accommodating portion
32a: End surface
33: Battery
40: Ladder frame
41: Side rail 41a: Web
41b: Flange
41c: Through-hole
42: Cross member
50: Driving device
51: Motor unit
52: Gear unit
D: Diameter of lightening hole 1h
F: Impact force
L1: Dimension in vehicle length direction of upper portion 1a
L2: Dimension in vehicle length direction of lower half of lower portion is
S1: First space
S2: Second space
W1: Dimension in vehicle width direction of first battery accommodating portion 31
W2: Dimension in vehicle width direction of second battery accommodating portion 32
W2': Dimension in vehicle width direction of second battery accommodating portion 32'
X: Distance between side rails 41

The invention claimed is:

1. A support device for a vehicle battery pack, the support device being configured to support a battery pack including: a first battery accommodating portion arranged in a first space between a pair of side rails constituting a ladder frame of a vehicle; a second battery accommodating portion arranged in a second space below the first space and continuous with the first battery accommodating portion; and batteries accommodated in the first battery accommodating portion and the second battery accommodating portion, the support device comprising:
    a frame-side bracket having first brackets extending from each of the side rails outward in a vehicle width direction and downward, and a second bracket extending in the vehicle width direction and connecting the first brackets to each other below the battery pack;
    a battery-side bracket projecting from an end surface on an outer side in the vehicle width direction of the second battery accommodating portion outward in the vehicle width direction; and
    an elastic coupling portion elastically connecting the frame-side bracket and the battery-side bracket.

2. The support device for the vehicle battery pack according to claim 1, wherein each one of the first brackets has flange portions respectively protruding outward in the vehicle width direction from a front edge and a rear edge thereof.

3. The support device for the vehicle battery pack according to claim 1, wherein the first bracket includes an upper portion fixed to a web of the side rail, an intermediate portion obliquely extending from the upper portion outward in the vehicle width direction and downward, and a lower portion extending downward from the intermediate portion and coupled to the second bracket.

4. The support device for the vehicle battery pack according to claim 1, wherein:
    the frame-side bracket includes a third bracket protruding inward in the vehicle width direction from the first bracket; and
    the elastic coupling portion is fixed to each of the second bracket and the third bracket.

5. The support device for the vehicle battery pack according to claim 1, wherein the first bracket has an upper portion fixed to a web of the side rail, the upper portion having a larger dimension in a vehicle length direction as compared to other portions of the first bracket.

6. The support device for the vehicle battery pack according to claim 1, wherein the second bracket has a box-shaped cross section orthogonal to the vehicle width direction.

7. The support device for the vehicle battery pack according to claim 1, wherein the first bracket has a lightening hole.

8. The support device for the vehicle battery pack according to claim 1, wherein the second bracket has a lightening hole.

9. The support device for the vehicle battery pack according to claim 1, wherein a dimension in the vehicle width direction of the second battery accommodating portion is larger than that of the first battery accommodating portion.

10. The support device for the vehicle battery pack according to claim 1, wherein a dimension in the vehicle width direction of the second battery accommodating portion is equal to that of the first battery accommodating portion.

11. An electric vehicle, comprising:
    the support device for the vehicle battery pack according to claim 1.

* * * * *